United States Patent [19]

Lawton

[11] Patent Number: 4,884,367

[45] Date of Patent: Dec. 5, 1989

[54] ROOT CONTROL BAG

[75] Inventor: Peter A. Lawton, Berwick, Australia

[73] Assignee: W & G Precision Instruments Pty. Ltd., Australia

[21] Appl. No.: 260,248

[22] Filed: Oct. 20, 1988

[30] Foreign Application Priority Data

Oct. 21, 1987 [AU] Australia ............................... P14995
Jul. 14, 1988 [AU] Australia ............................... PI9302

[51] Int. Cl.[4] ............................................. A01G 9/02
[52] U.S. Cl. ............................................ 47/78; 47/73; 47/76
[58] Field of Search .............................. 47/73, 75–78

[56] References Cited

U.S. PATENT DOCUMENTS 4,574,522 3/1986 Reiger et al. ........................... 47/76

FOREIGN PATENT DOCUMENTS 8404227 11/1984 PCT Int'l Appl. ..................... 47/76

Primary Examiner—David A. Scherbel
Assistant Examiner—Michele A. Van Patten
Attorney, Agent, or Firm—Lerner, David, Littenberg, Krumholz & Mentlik

[57] ABSTRACT

A root control bag of the invention is used to contain the roots of growing plant stock during in-ground cultivation prior to later excavation and transplantation after the plant has reached a desired stage of maturation. The root control bag includes a wall manufactured from a non-woven fabric formed of a multiplicity of substantially continuous, randomly aligned, polymeric fibres, needle puncture bonded together. A standard probe penetration test is defined in the specification and the physical characteristics of the fabric must fall within certain limits as defined with respect to the standard test. The test basically comprises pressing a standard probe through the fabric and recording the load on the probe. For each test an initial puncture reading is taken, as well as a final penetration reading.

9 Claims, 4 Drawing Sheets

POLYFELT TS 600 MATERIAL

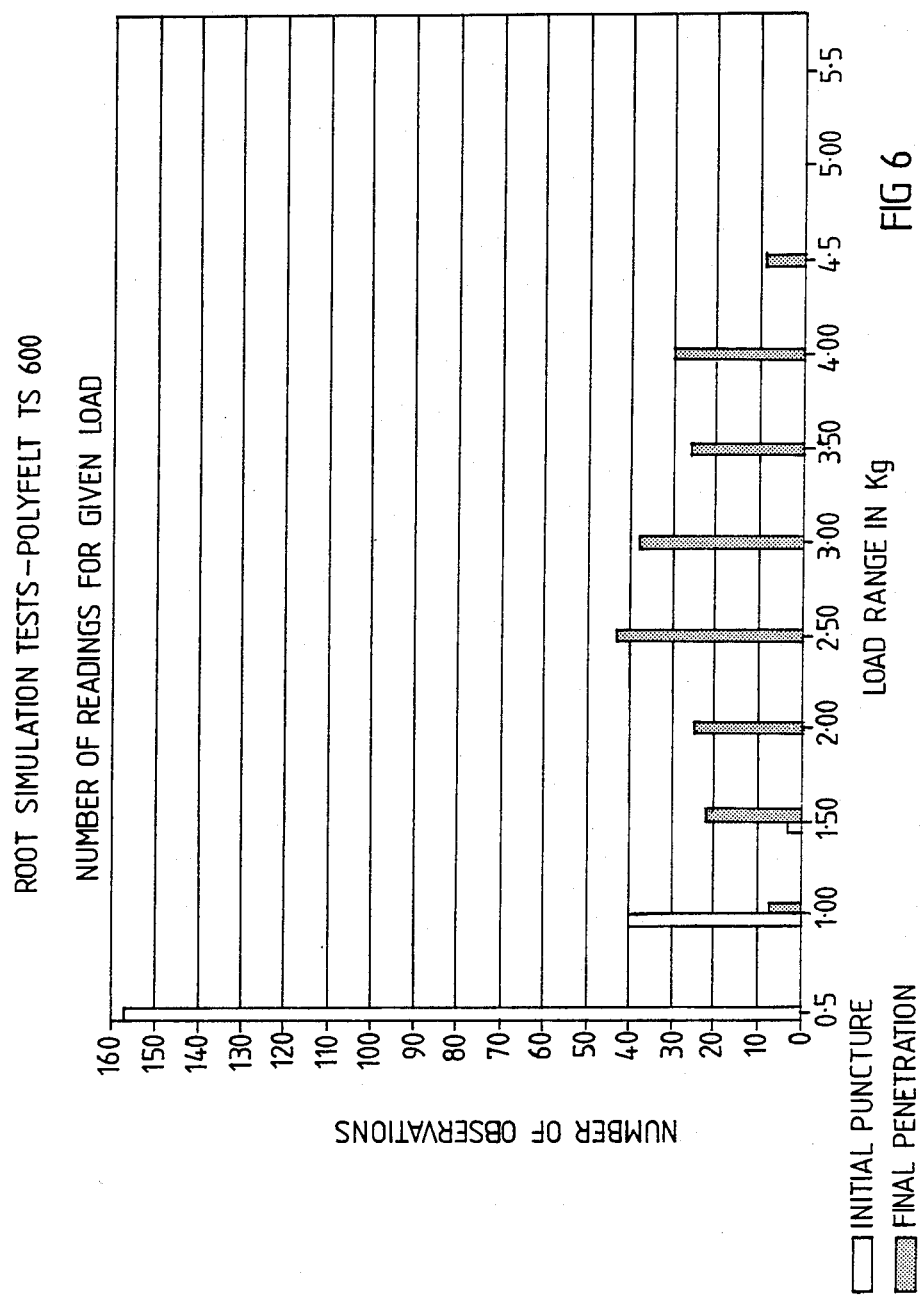

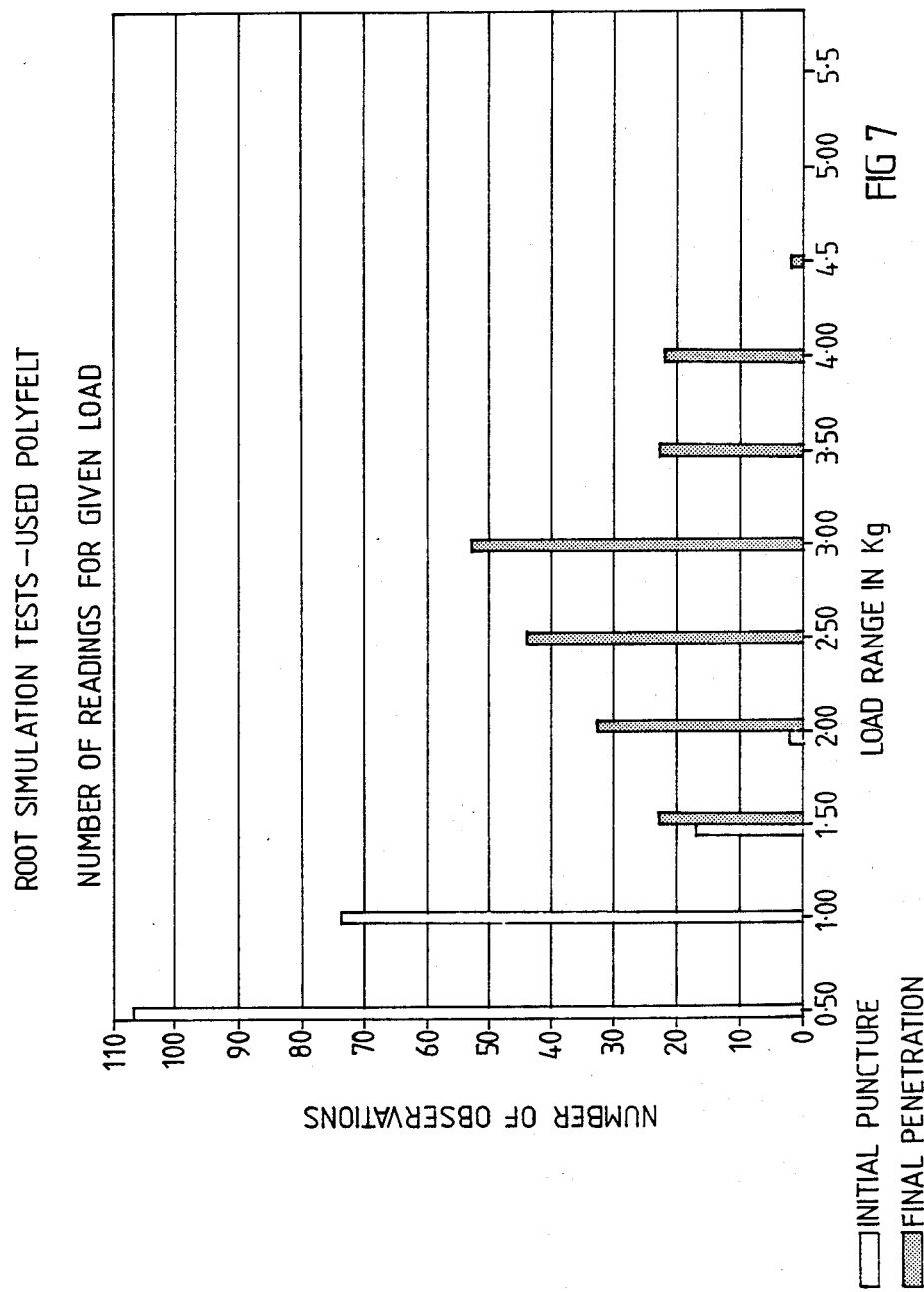

ROOT CONTROL BAG

INTRODUCTION

This invention relates to root control bags of the type used to restrict the roots of growing plant stock during in-ground cultivation prior to later transplantation after the plant has reached a desired stage of maturation. The invention is particularly concerned with bags of the type used in the method of cultivation described in U.S. Pat. No. 4,574,522.

BACKGROUND TO THE INVENTION

The specification of U.S. Pat. No. 4,574,522 describes the process of growing plant stock in root control bags and some of the advantages to be obtained thereby. The method basically involves the use of a porous fibre bag to confine plant root propagation to essentially the interior of the bag. The fabric must be of a nature which allows root penetration therethrough but restricts the radial expansion of the root after penetration to thereby have a girdling effect on roots which have penetrated the bag wall.

Various advantages have been obtained by using the aforementioned method. These advantages basically relate to the principle that a substantial proportion of root growth remains within the confines of the bag. The girdling effect on roots which penetrate the walls serves to effectively physically prune root growth outside the bag and this tends to promote root branching within the bag. The roots within the bag form a nodule at the point where bag penetration occurs and these nodules serve as a natural carbohydrate reservoir which enhances root growth after the bags have been removed and the plant is transplanted. The very fibrous root growth which occurs within the confines of the bag serves to hold the soil around the roots in a ball during transplantation which enhances the chance of successful transplantation. An important advantage is that with only relatively fine roots passing through the bag walls, removal of the bag and tree from the ground for transplantation elsewhere is a relatively simple task. The point at which the roots pass through the bag walls defines a natural weak structural point and when the bags are removed from the ground roots external to the bag tend to snap off at this weak point permitting easy excavation of the bag and root ball. The aforementioned U.S. specification describes the method of simply lifting the bag straight out of the ground. Another simple method of bag and plant excavation has been developed comprising simply excavating a trench along one side of a row of bag planted trees, and then pushing the trees over to lie in the trench thereby snapping off the roots at their weak point.

The aforementioned advantages rely to a major extent on the integrity of the material from which the bag is made. It has been found in practice that unrestricted root escapes through the bag walls tend to reduce significantly the advantages referred to, to a greater or lesser extent. If even one unrestrained root penetrates the bag wall this root has a tendency to rapidly expand in size and diameter until a major proportion of the plant's nutrient requirement is being supplied through the unrestrained root. FIG. 1 depicts a root control bag where unresticted root penetration has occurred.

Where unrestricted root penetration does occur the excavation of the plant becomes far more difficult in that the unrestricted root must be located and severed before the bag and plant can be removed from the ground. This generally involves digging right around the circumference of the bag, and possibly beneath the bag which is clearly a time consuming and labour intensive task. The aforementioned quick excavation techniques are not effective where unrestricted root penetration has occurred. Also, where unrestricted root penetration occurs the tendency of the roots to branch out within the bag is not as great, and the nodule formations do not occur as readily. Thus, carbohydrate is not retained within the bag to the same extent and secondary root branching does not occur to the same extent.

The problems referred to have the effect of decreasing the survival rate of trees which have been transplanted, or at least significantly limiting the growth of the tree after transplantation if it has been necessary to sever major roots which have penetrated the bag walls. Thus, the problems associated with unrestricted root penetration become compounded. Firstly, the cost of planting the nursery stock within a bag is greater than simply planting stock without a bag because of the cost of the bag and the cost of excavating a hole for the bag size. Secondly, excavation of bag and plant is as difficult as is excavating stock not planted in bags because of the problem of locating and severing the unrestricted root or roots. Thirdly, where unrestricted roots have escaped the root structure within the bag will not have developed to the same extent as root structures where complete root containment has occurred and accordingly the advantages referred to above will not be obtained. Thus, for a greater cost, transplantation stock is produced which is not significantly better than stock produced using traditional ball and burlap methods.

If any weak point exists in the material from which a bag is made there is a reasonable chance that a root will penetrate through that weak point. The aforementioned U.S. specification provides the example of a green ash tree being grown within a root control bag and developing a root structure with approximately 5000 roots wherein unrestricted root growth would have produced only about 150 roots for a similar growth period. Clearly, where such a massively fibrous root growth structure is developed the chance of one of those roots uncovering and penetrating the weak point in the bag is increased. The weak point can occur at any point in the material and it has been found to be particularly prevalent in the lower corners of the bag where the bag wall is stitched to the base of the bag.

It has been found where using root control bags manufactured from SUPAC or DUON non-woven fabric material by Phillips Fibres Corporation the following example results were obtained:

| TABLE SHOWING THE NUMBER OF ROOT PENETRATION FAILURES IN ROOT CONTROL BAGS MADE FROM PHILLIPS SUPAC MATERIAL (170 g/m²). | | |
|---|---|---|
| QUANTITY TOTAL | PLANT VARIETY | FAILURES NOTED WITH AT LEAST MAJOR ROOT PENETRATION THROUGH BAG WALL |
| 70 | *ULMUS PROCERA LOUIS VAN HOUTTE* | 57% |
| 26 | *ALNUS GLUTINOSA* | 80% |
| 17 | *PLATANUS ORIENTALIS* | 65% |
| 40 | *MALUS IOENSIS PLENA* | 57% |
| 48 | *QUERCUS PALUSTRUS* | 79% |
| 16 | *FRAXINUS EXCELSIOR AUREA* | 53% |
| 17 | *FRAXINUS RAYWOODI* | 60% |
| 17 | *ROBINIA FREESIA* | 41% |

Clearly these results are unsatisfactory. The problem in developing a material which has operational characteristics superior to that of the aforementioned Phillips material is that the requirements of the material are to some extent contradictory. Firstly, it is necessary that the roots are easily able to penetrate the bag walls, for if penetration does not occur the roots simply circle around within the bag in much the same manner as occurs with solid wall containers. Secondly, once a root has penetrated the bag wall the material must be able to provide the high strength girdling effect necessary to restrict radial expansion of the penetrated root. Thirdly, the material must be substantially free of weak points, and specifically, no one area should be so weak as to present an area which does not exhibit the girdling effect referred to above. The material should also not be subject to deterioration during the expected period of use of the bag in below ground conditions.

It is an object of this invention to provide a root control bag made from a material which satisfies these requirements.

SUMMARY OF THE INVENTION

According to the invention there is provided a root control bag having a wall manufactured from a non-woven fabric formed of a multiplicity of substantially continuous, randomly aligned, polymeric fibres, needle puncture bonded together, the physical characteristics of said fabric being such that when subjected to a set of standard probe penetration tests as herein defined in not more than $33\frac{1}{3}\%$ of the tests is the initial puncture load greater than 1 kg, and in not more than 2% of said tests is the final penetration load less than 1.25 kg, said fabric having a resistance to deterioration such that no significant deterioration of said physical characteristics is shown over a period of prolonged use under normal conditions.

Preferably the bag has a base and said base is formed of a material impervious to root penetration and rupture resistant, and preferably comprises a high strength reinforced plastics material sheet.

The term "standard probe penetration test" as used throughout this specification is to be understood as meaning a test conducted on a piece of fabric held taut—i.e., under a stretch load—across a test zone and which involves:

(1) supporting the fabric in the test zone,
(2) pressing against the taut fabric, the pointed end of a probe having substantially the form and the dimensions as shown and described in relation to FIG. 4 of the attached drawings,
(3) determining the force required (i.e., the puncture load) on the probe to cause the probe tip to puncture and penetrate through the fabric up to diameter "d", which force is referred to as initial puncture load,
(4) determining the force required (i.e., the puncture load) on the probe to cause the probe to penetrate further through the initially punctured fabric up to diameter "D", which force is referred to as final penetration load.

The term "set of probe penetration tests" as used throughout this specification is to be understood as meaning a number of tests as described in which each test is conducted at a different location on the same piece of fabric, and each test at each such location involves initial puncture followed by final puncture. It is generally satisfactory to include 200 tests in each such set of tests, but that number may vary according to circumstances and/or requirements. The section of fabric which is subjected to the tests of a set of tests, is generally referred to as being positioned at a test zone.

Reference in this specification to "significant deterioration" of the fabrics physical characteristics, is to be understood as meaning deterioration which is such as to result in the final puncture load being singificantly less than that stated above. Reference in this specification to "prolonged period under normal conditions of use" is to be understood as a period of two years during which the root control bag is buried in the earth and contains the roots of a tree of the size and nature normally expected to be planted in such a bag.

Embodiments of the invention and the test apparatus for determining the suitability of the material for root control bag applications are described below with reference to the accompanying illustrations.

BRIEF DESCRIPTION OF THE ILLUSTRATIONS

FIG. 6 depicts a graph showing a set of standard cone penetration test results conducted on new Polyfelt TS 600 material.

FIG. 7 depicts a graph showing a set of standard cone penetration test results conducted on Polyfelt TS 600 which has been used in in-ground field trials for a period of two years.

DETAILED DESCRIPTION OF PREFERRED EMBODIMENTS

Figure 1:
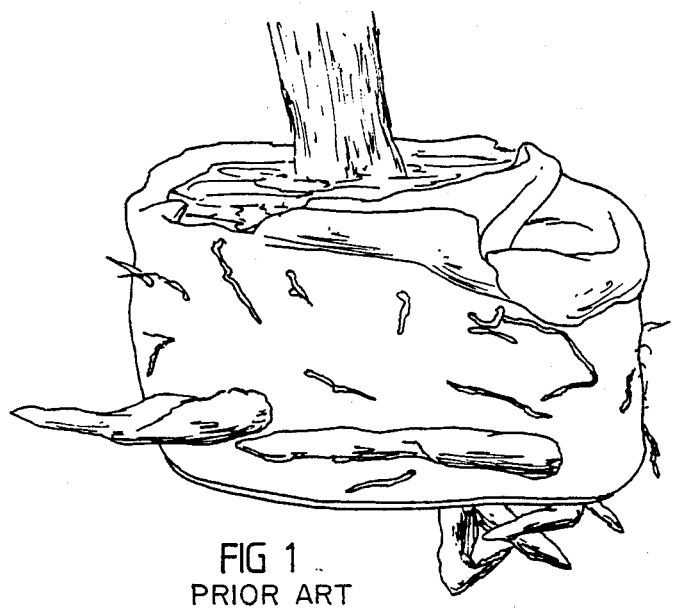
FIG. 1 is a drawing of a prior art root control bag with unrestricted root penetration through a wall thereof.
Figure 2:
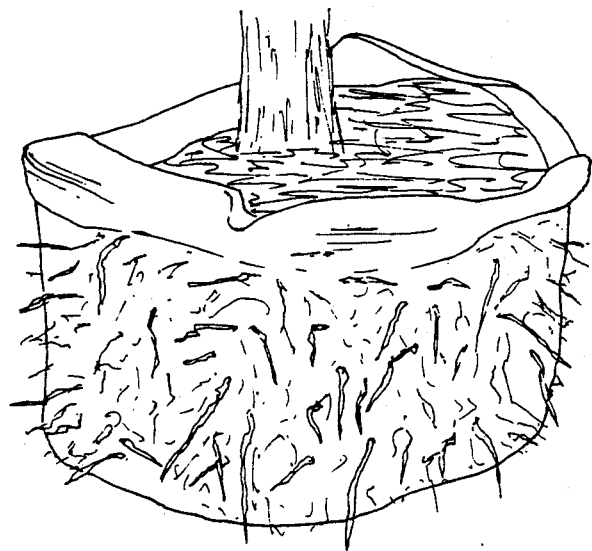
FIG. 2 is a drawing of a root control bag according to the invention wherein root penetration of the walls is uniformly restrained.

One suitable material that has been found to satisfy the requisite physical properties required by root control bags is manufactured by Polyfelt GMBH of Linz Austria under the trade marks "Polyfelt TS" and "Ecofelt". That product is constructed of high strength, ultra violet stabilized continuous filament polypropylene mechanically bonded by needle punching. The preferred grade of material is "Polyfelt TS 600" which has a mass of approximately 200 g/m$^2$ but the invention is not confined to materials of that mass. Clearly where bags are to be used with plants which have a vigorous root growth system a bag of heavier material may prove more suitable, and likewise where the root system is of a delicate nature a lighter material may prove satisfactory.

It has been found that the method of manufacture of Polyfelt material leads to a continuous fibre fabric which is particularly suitable for root control bag applications. The fibre material is thermoplastic and in a typical manufacturing process approximately 2500 fibre threads are simultaneously and continuously extruded onto a flat moving belt about 15 feet wide. The fibres pulled down by vacuum onto the belt in an entirely random manner so that individual fibres criss-cross and overlap on the belt. The large number of simultaneously extruded fibres results in a uniform matt of material which has a fluffy or irregular upper and lower surface.

The matt of material is then bonded into a high strength fabric by needle punching the material with blunt tipped needles which penetrate the matt from below and above to carry individual fibres through the thickness of the matt thereby further interlocking the fibres. Optionally there are a greater number of needle punctures from above than below. The density of needle punching can be varied but it is considered that a needle punching density of less than 150 needle punchings per square centimeter is undesirable. The preferred needle punching density is at least 180 needle punchings per square centimeter, preferably being provided by three banks of needles, two of which operate above the material and one bank operating from below the material. A needle punching density 50% higher than this preferred density has also been found to produce very satisfactory fabric material. The resulting fabric has a form which is substantially flat on the lower side and an upper side which is less fluffy or irregular than the material prior to needle punching, but which retains the irregular surface. This irregular surface is important as will become apparent herebelow.

A standard probe penetration test has been developed to test the suitability of fabric material for use in root control bags. The test basically involves the use of a cone shaped penetration probe 10 of specific configuration shown in FIG. 4 which is pushed through the fabric material. The fabric material is stretched at a load of 1kg per 1 cm width of material. Preferably the fabric is supported on the opposite side of the fabric from which the probe is pushed through. The support means may comprise a support grid held substantially flush with the plane of the fabric. The support grid will define a grid spacing through which the probe can be pushed through over the surface of the test zone. The resistance of the probe to initial penetration and then to further penetration at the point when the diameter of the probe is 3 mm are measured.

Figure 4:
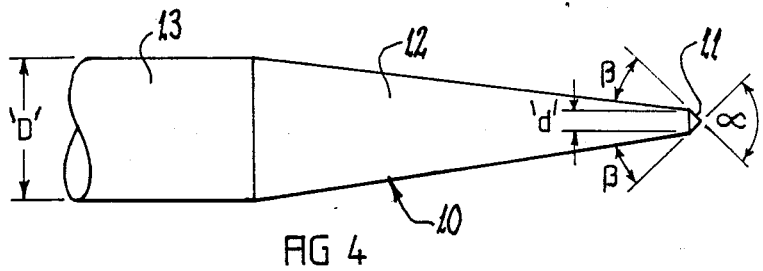
FIG. 4 is a diagrammatic illustration of probe penetration test apparatus.

The probe 10, which is formed of tempered steel machined to a fine polish surface, comprises a tip 11, an intermediate cone shaped portion 12, and a shank 13 of constant diameter. The standard probe has the following configuration. The tip 11 has a cone angle $\alpha$ equal to 90° and the diameter "d" at the base of the tip is equal to 0.5 mm. The intermediate portion 12 has a cone angle of 20° which means that angle $\beta$ as shown in FIG. 4 is 35°. Diameter "D" at the base of intermediate portion 12 is 3 mm. The diameter of shank 13 is constant and is also 3 mm. The probe has a circular cross section along its entire length.

Figure 5:
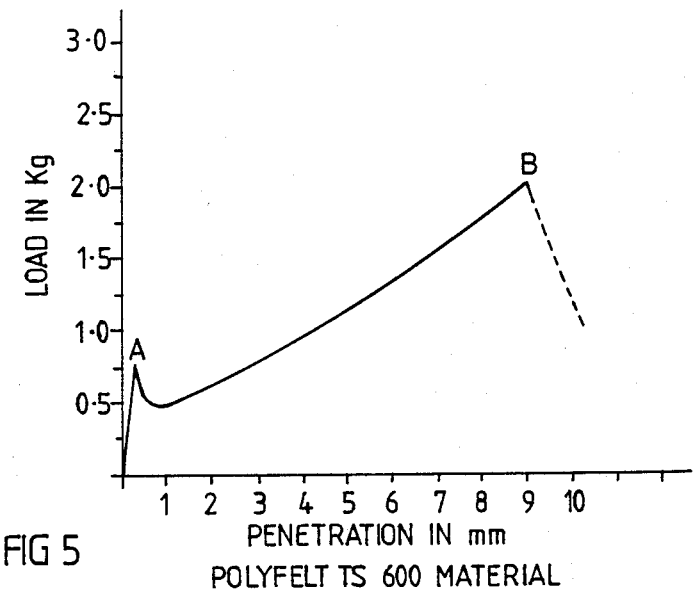
FIG. 5 depicts a graph showing a simple standard cone penetration test result conducted on new Polyfelt TS 600 material.

During each test two readings are taken, and FIG. 5 of the drawings neatly depicts the points at which those readings are taken. The first point "A" represents the occurrence when diameter "d" of the tip 11 of the probe just penetrates through the material and has been defined as the "initial puncture load".

Thereafter further penetration of the probe 10 through the fabric material will be resisted by the girdling effect of the fabric material on the intermediate portion 12. It will be noted that the intermediate portion 12 has a cone angle of 20° and will thus penetrate through the material fairly easily, even if a substantial girdling effect is placed on the probe 10. The girdling effect will increase gradually as the probe is pressed through the material until such time as the point 14 on the probe where the intermediate portion 12 joins the shank 13 passes through the material. After the point 14 has passed through the material the resistance to penetration will fall rapidly, forming a second peak "B" on the graph which is the point which has been defined as the "final penetration load".

The configuration of the probe, as shown in FIG. 4, for the standard probe penetration test has been selected with a view to the configuration of a growing root. The tip 11 configuration matches substantially the shape of a root cap which covers the growing tip of a root to protect the root from damage as it presses through the soil. The shank diameter of 3 mm is selected as the point at which final penetration load is measured since this is substantially the maximum diameter of xylem of a growing root. Thus, it is important that at a diameter of opening of 3 mm the radial restraint provided by the bag material is significant and accordingly the restraint provided by material at this diameter is measured. The cone angle of the intermediate portion is selected to be 20° so as to sensitively discriminate between satisfactory and unsatisfactory materials. It will however be appreciated that the test is a relatively simple test with results being repeatable, provided the same probe configuration is used to perform the tests.

The following test results have been obtained using the standard probe penetration test. A set of tests was conducted on each type of material.

| Material | Average initial resistance to puncture kg | Standard Deviation | Average final resistance to penetration kg | Standard Deviation |
|---|---|---|---|---|
| Polyfelt TS 600 (unused) | 0.62 | 0.23 | 2.86 | 0.95 |
| Polyfelt TS 600 (used in-ground for two years) | 0.79 | 0.34 | 2.75 | 0.79 |

FIG. 6 of the drawings depicts in bar graph form the results obtained from the set of tests conducted on Polyfelt TS 600 material. Both the initial puncture results and final penetration results are indicated on the graph. It will be evident that the majority of results for the initial puncture load fall in the range 0 to 1 kg. The results for final penetration load show a substantially normal distribution with the mean load of final penetration occurring substantially between 2.5 and 3 kg. Using simple statistical analysis on the results the standard deviation of results can be determined. FIG. 7 depicts a similar graph for tests conducted on Polyfelt TS 600 material which has been used in-ground for a period of two years.

A material which has more than a small percentage of results falling below about 1.25 kg will be unsatisfactory for root control bags for such a material will allow unrestricted root penetration through the weak spots. However, the random fibre constriction and unwoven nature of suitable material will sometimes result in a weak spot. It has been determined that provided 2% of results, that is approximately the lower limit of two standard deviations, does not fall below 1.25 kg the material will be suitable for root control bags. Clearly, it is desirable that the fabric material produces a more uniform set of results, and in the preferred range of results 2% of results will not fall below 1.75 kg.

A root control bag will usually be used in-ground for a period of at least one growing season and usually two or three growing seasons.

The following field trial results have been obtained using Polyfeld TS 600 root control bags:

| TABLE SHOWING RESULTS OF FIELD TRIALS USING ROOT CONTROL BAGS MADE FROM POLYFELT TS600 (200 g/m²) | | |
|---|---|---|
| QUANTITY | VARIETY | FAILURES NOTED WITH AT LEAST ONE MAJOR ROOT PENETRATION THROUGH BAG WALL |
| 16 | *ALNUS JORULLENSIS* | NIL |
| 21 | *EUCALYPTUS SCOPARIA* | NIL |
| 19 | *EUCALYPTUS NICHOLI* | NIL |
| 32 | *HYMENOSPORUM FLAVUM* | NIL |
| 22 | *BETULA PENDULA* | NIL |
| 4 | *ANGOPHORA COSTATA* | NIL |
| 24 | *CASURINA CUNNINGHAMIANA* | NIL |

It will be noted that the Polyfelt material bags provide a problem free result and have proved most satisfactory in all field trials conducted to date.

Close inspection of the Phillips material bags used in field trials have indicated that some of the problems with the material relate to the fact that the Phillips material is formed of staple fibres. The specification of U.S. Pat. No. 4,574,522 indicates that the preferred staple lengths are about one and a half to ten inches long. The staple fibre make up of the fabric allows roots which penetrate the bag walls to more easily displace individual fibres. It has been noted that problems are found particularly where the roots have penetrated the walls at an angle of up to 5° to the plane of the wall material (see FIG. 1). Roots seem to uncover weak points in the fabric material during the growth period and radial enlargement of the root over a period of time serves to gradually enlarge the opening so formed. The fact that the Phillips material is comprised of staple fibre causes individual fibres to slip within the fabric when tensile stress is placed on the individual fibres, allowing the opening to be enlarged over a period of time without providing the necessary resistance to opening enlargement, and thereby not providing the necessary girdling effect for the root growing in that opening. It is also apparent that a delamination of the material occurs.

Figure 3:
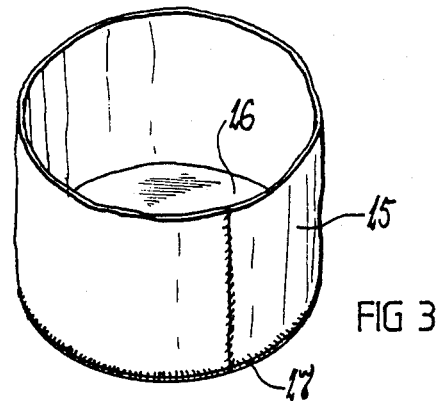
FIG. 3 is a diagrammatic perspective illustration of a root control bag according to the invention.

A further problem which has been uncovered during field trial tests is that roots escape through the base of the bag. It has been found that this problem can be at least substantially overcome by providing the bag with a high strength rupture resistant base which is stitched to the bag wall using a high strength stitching yarn. It has been found that a base material manufactured from a high strength polyethelene sheet reinforced with suitable reinforcing weave is resistant to tearing and rupture and serves to satisfy the requirements of root control bags. A suitable material which satisfies the strength requirements of root control bags is "Fabricon" (Trade Mark) which is manufactured by Rheem Australia Limited of Victoria, Australia. An alternative method of forming a rupture resistant base will be to laminate together a sheet of wall material with impervious polyethelene or like plastics material by thermal or other bonding or with a suitable adhesive. The wall material will provide the strength for the base, whilst the plastics sheet will prevent root penetration. A suitable root control bag is depicted in FIG. 3 of the illustrations. The wall of the bag is indicated by numeral 15 whilst the base is indicated by numeral 16. Stitching 17 is used to join the base 16 to the wall 15. Clearly the size of the bag will be selected depending on the plant to be grown therein.

Root control bags have frequently failed during test trials at the point where the base material is stitched to the wall material. This problem has however been overcome by stitching the base material to the wall material by using a combination of overlocking stitch and plain chain stitch to form the stitched join. The strong stitched join has had the effect of preventing root escape at the join.

One significant and surprising advantage of having a bag which does not allow any unrestrained root escape is that the bag provides a control facility for regulating plant stock growth. A tree which grows too large is not only difficult to handle, transport, and replant, but the chances of successfully transplanting trees diminishes where the trees become too large unless massive root balls are taken at very high cost. It has however been noted in field trials where trees are grown within root control bags according to the invention having 100% effective root control characteristics that the tree will reach predetermined size, defined by the bag size, and thereafter the tree will be restrained in size due to the inability of the root structure to expand in the normal manner whilst the tree is maintained in a vigorous and healthy state. This restraining is similar to that displayed by bonsai trees where roots are periodically pruned to stunt growth. The advantage of this method of tree growth is that the size nursery stock can be restricted to a suitably manageable size by using effective root control bags and the trees maintained in this state of equilibrium until such time as they are sold. After transplantation, normal growth can resume stimulated by substantial root nodulation.

As previously mentioned, the irregular or fluffy face of the material from which the fabric is made is advantageous in that the irregular face of the material is placed on the inner side of the bag and presents a surface which is not resistant to initial root penetration and encourages roots to seek a path through the fabric material. In tests when the smooth side of the material is placed inwards the tendency for roots simply to circle around within the bag has been found to be far more prevalent. This is also the case where the fabric material is thermoplastic bonded or is a woven material. The fluffy face of the material tends to capture roots and guide the root tips through the material. As is mentioned above, it is desirable that roots penetrate the bag walls with as little resistance as possible and the fluffy face of the material tends to facilitate this penetration. The fluffiness or irregularity of the surface can be controlled during manufacture by controlling the rate of needle puncture.

From the aforegoing it will be appreciated that a material which exhibits the seemingly contradictory characteristics referred to above, that is ease of initial penetration but high resistance to radial enlargement, will prove to be most satisfactory for root control bags. Clearly, the material must also exhibit that characteristic over a long period, for even a gradual deterioration in resistance to radial hole enlargement will allow circumferential root enlargement of primary, secondary or tertiary roots which is undesirable.

The invention is not confined to the materials referred to above as preferred materials, and it will be appreciated that various materials will exhibit the physical and strength characteristics identified above as being important to the effective working of the invention.

Having now described my invention, what I claim as new and desire to secure by Letters Patent is:

1. A root control bag having a wall manufactured from a non-woven fabric formed of a multiplicity of substantially continuous, randomly aligned, polymeric fibres, needle puncture bonded together, the physical characteristics of said fabric being such that when subjected to a set of standard probe penetration tests as herein defined in not more than $33\frac{1}{3}$% of the tests is the initial puncture load greater than 1 kg, and in not more than 2% of said tests is the final penetration load less than 1.25 kg, said fabric having a resistance to deterioration such that no significant deterioration of said physical characteristics will be shown over a period of prolonged use under normal conditions.

2. A root control bag according to claim 1 wherein said wall comprises said fabric which when subjected to a set of standard probe penetration tests in not more than 2% said tests is the final penetration load less than 1.75 kg.

3. A root control bag according to claim 1 wherein the fibres from which said fabric is formed comprise ultra-violet stabilized polypropylene filament.

4. A root control bag according to claim 1 wherein said fabric has been mechanically bonded by needle punching at a needle punch density of not less than 150 punchings per square centimeter of fabric material.

5. A root control bag according to any claim 1 wherein said fabric has a mass of between 100 and 250 g/m$^2$.

6. A root control bag according to claim 1 wherein said bag has a base formed of a high strength reinforced impervious plastic material having a tensile strength of not less than 10 kN/m.

7. A root control bag according to claim 6 wherein said base is stitched to said walls with a combined overlocking and plain chain stitch using stitching yarn having a breaking strength of not less than 1 kN.

8. In a method for growing plant stock for later transplantation the specific improvement comprising:
   (a) excavating a hole in the ground
   (b) inserting within the hole a root control bag having a wall manufactured from a non-woven fabric formed of a multiplicity of substantially continuous, randomly aligned, polymeric fibres, needle puncture bonded together, the physical characteristics of said fabric being such that when subjected to a set of standard probe penetration tests as hereinbefore defined in not more than $33\frac{1}{3}$% of the tests is the initial resistance to puncture greater than 1 kg, and in not more than 2% of said tests is the final resistance to final penetration less than 1.25 kg, said fabric having a resistance to deterioration such that no significant deterioration of said physical characteristics is shown over a period of prolonged use under normal conditions,
   (c) filling said bag with growing media, and
   (d) growing a plant within said bag in the ground such that the bag and the growing plant can thereafter be excavated from said ground and transported for transplantation elsewhere.

9. A method according to claim 8 wherein the method includes the further step of retaining the bag and plant in ground for a time period such that further plant growth is restricted by girdling effect of the fabric on all roots prior to the excavation of said plant from said ground.

* * * * *

REEXAMINATION CERTIFICATE (2419th)

United States Patent [19]

Lawton

[11] B1 4,884,367

[45] Certificate Issued Nov. 1, 1994

[54] ROOT CONTROL BAG

[75] Inventor: Peter A. Lawton, Berwick, Australia

[73] Assignee: W & G Precision Instruments Pty, Ltd., Australia

Reexamination Request:
No. 90/002,903, Dec. 4, 1992

Reexamination Certificate for:
Patent No.: 4,884,367
Issued: Dec. 5, 1989
Appl. No.: 260,248
Filed: Oct. 20, 1988

[30] Foreign Application Priority Data

Oct. 21, 1987 [AU] Australia ............... PI4995
Jul. 14, 1988 [AU] Australia ............... PI9302

[51] Int. Cl.$^5$ .................................. A01G 9/02
[52] U.S. Cl. .................................. 47/78; 47/66
[58] Field of Search ........... 47/78, 73, 76, 66, 66 B, 47/59

[56] References Cited

U.S. PATENT DOCUMENTS

| | | | |
|---|---|---|---|
| 4,042,655 | 8/1977 | Platt | 264/25 |
| 4,098,021 | 7/1978 | Gruber | 47/66 |
| 4,154,889 | 5/1979 | Platt | 428/234 |
| 4,199,644 | 4/1980 | Platt | 428/300 |
| 4,574,522 | 11/1986 | Reiger et al. | 47/78 |
| 4,888,914 | 12/1989 | Reiger | 47/78 |
| 5,103,588 | 4/1992 | Reiger | 47/78 |
| 5,167,092 | 12/1992 | Reiger | 47/78 |

FOREIGN PATENT DOCUMENTS

| | | | |
|---|---|---|---|
| PI4995 | 10/1987 | Australia . | |
| PI9302 | 7/1988 | Australia . | |
| 2744143 | 4/1979 | Germany | 47/73 |
| 0138325 | 8/1982 | Japan | 47/78 |

*Primary Examiner*—Henry E. Raduazo

[57] ABSTRACT

A root control bag of the invention is used to contain the roots of growing plant stock during in-ground cultivation prior to later excavation and transplantation after the plant has reached a desired stage of maturation. The root control bag includes a wall manufactured from a non-woven fabric formed of a multiplicity of substantially continuous, randomly aligned polymeric fibres, needle puncture bonded together. A standard probe penetration test is defined in the specification and the physical characteristics of the fabric must fall within certain limits as defined with respect to the standard test. The test basically comprises pressing a standard probe through the fabric and recording the load on the probe. For each test an initial puncture reading is taken, as well as a final penetration reading.

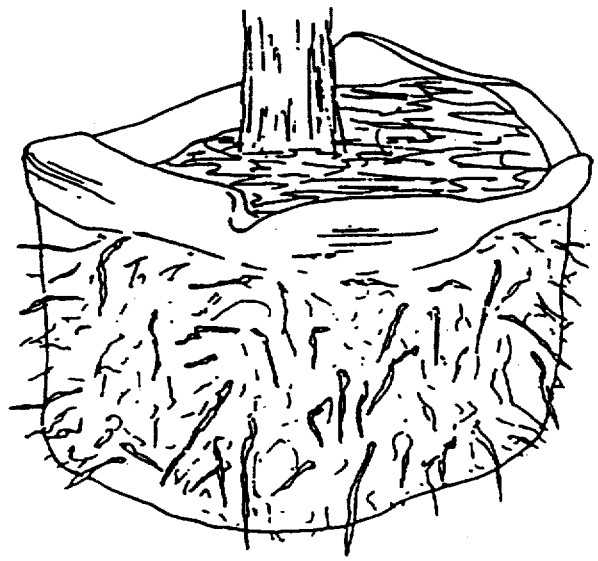

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 8 are determined to be patentable as amended.

Claims 2-7 and 9, dependent on an amended claim, are determined to be patentable.

New claims 10-21 are added and determined to be patentable.

1. A root control bag having a wall manufactured from a non-woven fabric formed of a multiplicity of substantially continuous, randonly aligned, polymeric fibres, needle puncture bonded together, the physical characteristics of said fabric being such that when subjected to a set of standard probe penetration tests [as herein defined] *wherein a penetration probe simulating a growing root of a specific plant to be grown in said root control bag is pressed against the taut fabric and the initial puncture load required to initially penetrate the fabric and the final penetration load required to reach a diameter simulating the maximum desirable diameter of xylem of said growing root of said specific plant are determined,* said physical characteristics are such that in not more than 33⅓% of the tests is the initial [resistance to puncture] *puncture load* greater than 1 kg, and in not more than 2% of said tests is the final [resistance to final penetration] *penetration load* less than 1.25 kg., said fabric having a resistance to deterioration such that no significant deterioration of said physical characteristics [is] *will be* shown over a period of prolonged use under normal conditions, (c) filling said bag with growing media, and
(d) growing a plant within said bag in the ground such that the bag and the growing plant can thereafter be excavated from said ground and transported for transplantation elsewhere.

*10. A root control bag according to claim 1, wherein said penetration probe includes a control tip, an intermediate cone-shaped portion and a shank of constant diameter.*

*11. A root control bag according to claim 10, wherein said tip has an included angle of about 90°.*

*12. A root control bag according to claim 10, wherein said intermediate portion has an included angle of about 20°.*

*13. A root control bag according to claim 10, wherein said intermediate portion has a first end connected to said tip and a second end connected to said shank, said first end of said intermediate portion having a diameter of about 0.5 mm and said second end of said intermediate portion having a diameter of about 0.5 mm and said second end of said intermediate portion having a diameter of about 3 mm, and said shank having a constant diameter of about 3 mm.*

*14. A root control bag according to claim 10, wherein said penetration probe has a polished surface.*

*15. A root control bag according to claim 10, wherein said probe penetration tests are conducted while the fabric is held taut at a load of about 1 kg/1 cm width of material.*

8. In a method for growing plant stock for later transplantation the specific improvement comprising:
(a) excavating a hole in the ground
(b) inserting within the hole a root control bag having a wall manufactured from a non-woven fabric formed of a multiplicity of substantially continuous, randomly aligned, polymeric fibres, needle puncture bonded together, the physical characteristics of said fabric being such that when subjected to a set of standard probe penetration tests [as hereinbefore defined] *wherein a penetration probe simulating a growing root of a specific plant to be grown in said root control bag is pressed against the taut fabric and the initial puncture load required to initially penetrate the fabric and the final penetration load required to reach a diameter simulating the*

*16. The method according to claim 8, wherein said penetration probe includes a conical tip, an intermediate cone-shaped portion and a shank of constant diameter.*

*17. A method according to claim 16, wherein said tip has an included angle of about 90°.*

*18. A method according to claim 16, wherein said intermediate portion has an incuded angle of about 20°.*

*19. A method according to claim 16, wherein said intermediate portion has a first end connected to said tip and a second end connected to said shank, said first end of said intermediate portion having a diameter of about 0.5 mm and said second end of said intermediate portion having a diameter of about 0.5 mm and said second end of said intermediate portion having a diameter of about 3 mm, and said shank having a constant diameter of about 3 mm.*

*20. A method according to claim 16, wherein said penetration probe has a polished surface.*

*21. A method according to claim 16, wherein said probe penetration tests are conducted while the fabric is held taut at a load of about 1 kg/1 cm width of material.*

* * * * *